United States Patent [19]

Welsh et al.

[11] Patent Number: 4,629,960
[45] Date of Patent: Dec. 16, 1986

[54] INDUCTION MOTOR CONTROLLER

[75] Inventors: David A. Welsh, Largo; Denis O. Rehse, St. Petersburg, both of Fla.

[73] Assignee: Energy Motor Control, Inc., St. Petersburg, Fla.

[21] Appl. No.: 680,395

[22] Filed: Dec. 11, 1984

[51] Int. Cl.⁴ .............................................. H02P 5/40
[52] U.S. Cl. .................................... 318/729; 318/812
[58] Field of Search ................................ 318/729, 812

[56] References Cited

U.S. PATENT DOCUMENTS

| | | | |
|---|---|---|---|
| 4,117,408 | 9/1978 | Comstedt | 318/805 |
| 4,298,834 | 11/1981 | Opfer | 318/729 |
| 4,469,998 | 9/1984 | Nola | 318/729 |

Primary Examiner—David Smith, Jr.
Attorney, Agent, or Firm—Frijouf, Rust & Pyle

[57] ABSTRACT

A motor control apparatus is disclosed for controlling and reducing power consumption of a 3-phase induction motor, wherein the motor control apparatus includes control means for controlling current flow in each phase line and voltage sensing means across each control means for sensing back emf when the control means is electrically open in order to measure slip of the motor. A reference voltage signal representative of line voltage is subtracted from the summed back emf measurements in order to provide a voltage control signal which is a function of motor slip. Current measurement means in the form of a current transformer associated with one supply line is provided for measuring current drawn by the motor. The voltage control signal and the current signal are processed to develop a phase control signal for controlling a phase control means and a driver means associated with each control means. A starting control means for providing a soft start for the induction motor is also disclosed.

9 Claims, 6 Drawing Figures

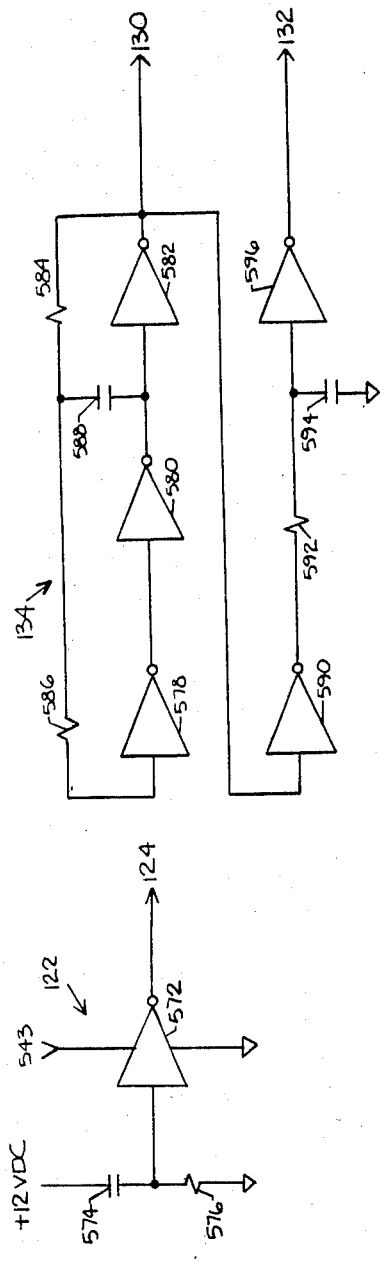

INDUCTION MOTOR CONTROLLER

BACKGROUND OF THE INVENTION

1. Field of the Invention

This invention relates to controls for electric motors and more particularly to an apparatus for controlling a 3-phase induction motor.

2. Information Disclosure Statement

With the increasing cost of electrical power, great emphasis has been placed on increasing the efficiency of devices which consume electrical power. An appreciable amount of electrical power is consumed by electrical motors in industrial applications. Due to ease of power transmission and to ease of maintenance of the electric motors, the AC induction motor is preferred over DC power and DC motors. Therefore, most industrial electrical motors are AC induction motors. Whereas a single phase induction motor may be used in relatively small sizes, the 3-phase induction motor is typical in the larger applications. It is well known that the torque supplied by an induction motor is proportional to the square of the voltage applied to the stator windings. The iron losses within the induction motor are also approximately proportional to the square of the applied voltage. Industrial applications of induction motors quite often involve uses where the rated torque is required only for short and infrequent intervals, and the motor is "idling" for appreciable intervals. The alternative is to stop and start the motor as required, but it is well known that starting current is exceptionally high due to the low back emf of the motor and frequent starting also tends to shorten motor life and cause transients in the power lines. The power factor varies tremendously with motor load: at rated load, the power factor of an induction motor is at a maximum, while the power factor can be quite low when the motor is operating without load or with a small load. During this low power factor condition, there can be considerable current flow even though little power is produced since the current and voltage are considerably out of phase. The extra current flow without any additional power requirement results in IIR losses in the motor and elsewhere throughout the system. Additional charges are often incurred from the power generating source for such additional current flow, even though real power is not consumed.

Some of the approaches which have been developed to increase the efficiency of the AC induction motor involve changes to the motor itself. As a result, a new generation of AC induction motors has been created which is considerably more efficient than the older motors. One such well known approach is known as the Wanlass motor which attempts to optimize the value of a capacitor in series with the motor winding in order to increase the efficiency of the induction motor. An alternative general approach is to either synthesize and control the AC power for each individual induction motor according to requirements, or to install a motor control apparatus between a standard power source and a standard AC induction motor. A well known controller of the latter type is the power factor controller developed by Frank J. Nola which has been the subject of U.S. Pat. Nos. 4,052,648, 4,266,177, and 4,404,511. The Nola controller measures the zero crossings of the voltage and the current and increases the voltage applied to the motor as the difference in zero crossings decreases. Although the Nola controller can perform quite well under load conditions which do not vary too rapidly, there is some tendency for the Nola controller to exhibit instability. When the controller is adjusted to decrease sensitivity so as to avoid instabilities such as very low frequency oscillations, then the Nola controller tends to be relatively slow to respond to changes in the motor power factor and/or line voltaqe.

Another approach in the design of a motor controller to be installed in series between the AC source and the induction motor has been developed by the Vectrol Division of Westinghouse Electric Corporation. The Vectrol unit, marketed as the "Startrol Power Miser," measures the back emf across the electronic switch in series in each supply line during the time that the electronic switch is open, and subtracts out the line voltage in order to determine the slip of the motor. Current drawn by the motor is sensed by a current transformer associated with one of the supply lines in the 3-phase system. A major problem with the Vectrol design, however, is that the motor controller unit is essentially different in each application in that the current transformer must be selected carefully and matched to the particular size of motor to be controlled.

Another motor controller which measures back emf across the electronic switches in series with each supply line and subtracts out line voltage to determine slip, as well as utilizing a current transformer to measure current drawn by the motor is the design shown in FIG. 2 of this application and discussed in detail hereinafter. Although this improved design permits compensation for variations in current transformers by selecting the value of a feedback resistor, the degree of compensation is not sufficient to meet all situations and the system also tends to exhibit some lack of sensitivity to decreases in line voltage.

Therefore, it is an object of this invention to provide an apparatus which overcomes the aforementioned inadequacies of the prior art devices and provides an improvement which is a significant contribution to the advancement of the pertinent art.

Another object of this invention is to provide a motor control apparatus for a 3-phase induction motor having a control means for controlling current flow in each supply line, the control means responding to phase control means and driver means which are controlled by a measurement of back emf across each such control means and by measurement of current drawn by the motor, wherein the back emf measurement is corrected for variations in line voltage by a sensing circuit which includes a pair of reverse-connected diodes to equalize the response of the motor control apparatus to both increases and decreases in line voltage.

Another object of this invention is to provide a motor control apparatus with an adjustable voltage divider used in conjunction with comparator means for compensating for variations in current transformers used to measure current drawn by the induction motor.

Another object of this invention is to provide a motor control apparatus for a 3-phase induction motor wherein the motor control apparatus has increased filtering of a reference voltage signal representative of line voltage.

Another object of this invention is to provide a motor control apparatus for a 3-phase induction motor wherein the motor control apparatus has a starting control means for providing a soft start for the motor, and wherein a special discharge path is provided to protect the final comparator in the starting control means.

Other objects and a fuller understanding of this invention may be had by referring to the summary of the invention, the description and claims, taken in conjunction with the accompanying drawings.

SUMMARY OF THE INVENTION

The motor control apparatus of the instant invention includes control means placed in series between each supply line and the 3-phase induction motor. The control means includes an electronic switch comprising two SCR components reverse-connected in parallel, the parallel combination being connected in series between the phase supply line and the motor in each of the three supply lines. This connection permits the control of current flow in either direction in each of the three phases. Means are provided for sensing the emf across the electronic switches; when the switches are closed, the emf across the switch will be essentially zero, but when the switches are open the back emf measured across the open switch will provide an indication of motor slip. Crossover reference means are provided for each of the three supply lines to be used as a reference in the phase control means. A separate phase control means for each phase is included in the instant invention, the phase control means for any given phase accepting the system phase control signal together with the crossover reference signal for the individual phase with which the phase control means is associated. The phase control means provides control signals for a separate driver means for each of the three phases. The driver means for any given phase provides the firing control for the SCR components in the control means previously mentioned within each phase line.

The motor control apparatus of the instant invention includes a power supply having an output representative of line voltage in addition to the various DC outputs required for power within the apparatus. Signals representative of the back emf measured across each control means when the electronic switches are open are summed and compared with the voltage reference signal representative of line voltage in order to subtract out the effects of the line voltage. Current sensing means in the form of a current transformer is used to develop a current signal representative of current drawn by the motor. The current signal is processed to limit the maximum voltage which may be applied to the windings of the motor, and the processed current signal together with a signal intended to limit the minimum voltage to be applied to the windings together with the indication of slip from the summed back emf measurements is then processed to yield the phase control signal previously mentioned as being used by the phase control means associated with each of the three phase lines.

A starting control means is also provided which disables the current sensing means during the starting interval and provides a gradually increasing starting ramp signal for creation of the phase control signal during the starting interval. The length of the starting interval is adjustable, as is the steepness of the starting ramp signal in order to control the torque of the motor during the starting interval.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should be realized by those skilled in the art that such equivalent constructions do not depart from the spirit and scope of the invention as set forth in the appended claims.

BRIEF DESCRIPTION OF THE DRAWINGS

FIG. 4 is a schematic showing the phase control enable means; and

FIG. 5 is a schematic showing the oscillator means.

Similar reference characters refer to similar parts throughout the several views of the drawings.

DETAILED DESCRIPTION

Figure 1:
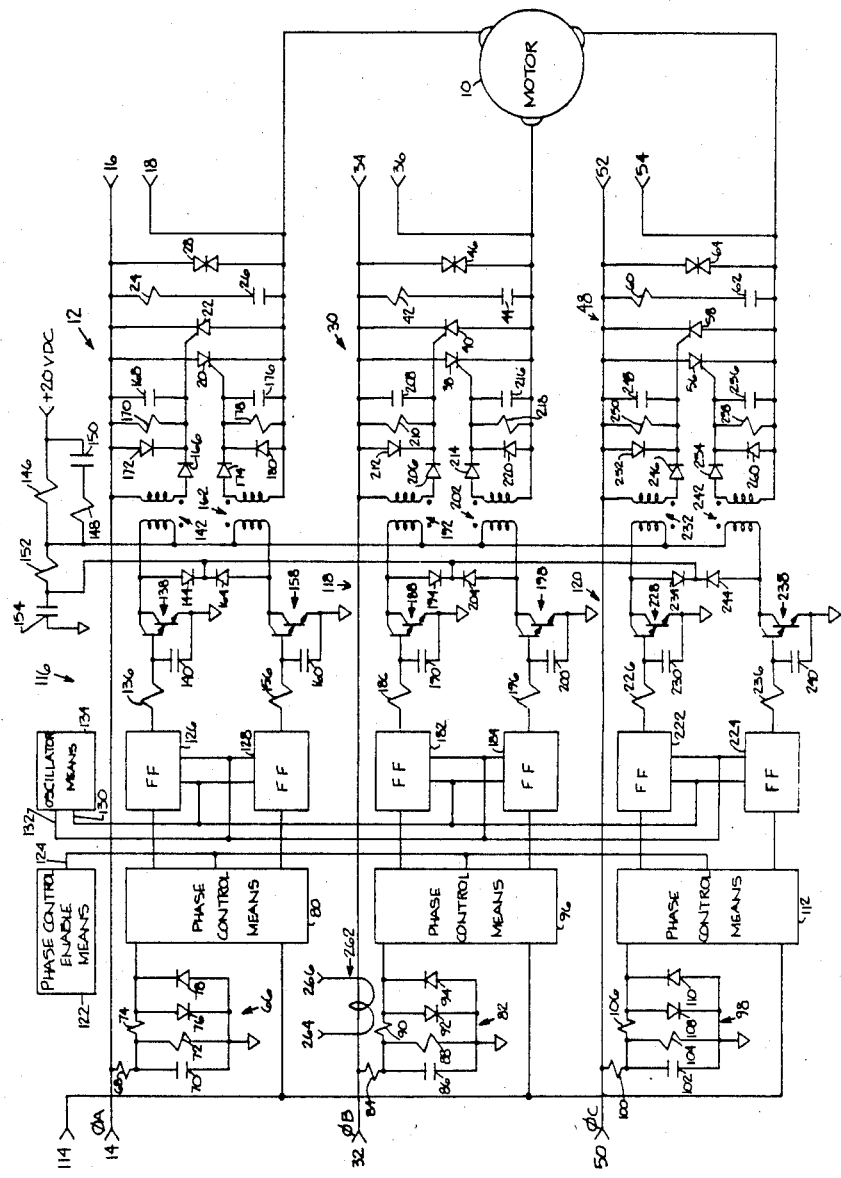
FIG. 1 is a schematic diagram of the sensing and control means.

FIG. 1 is a schematic diagram of the sensing and control means for a motor control apparatus for a 3-phase induction motor 10 according to the instant invention. A first control means, generally designated 12 in FIG. 1, is connected in series between a first supply line 14 and the motor 10. A first voltage sensing means including lines 16 and 18 is connected across the first control means 12 mentioned above. Such a connection permits the measurement of the back emf across the first control means 12 whenever the first control means 12 is electrically open. First control means 12 includes SCR 20, the anode of which is connected to first supply line 14 and the cathode of which is connected to motor 10. First control means 12 also includes SCR 22, the cathode of which is connected to first supply line 14 and the anode of which is connected to motor 10, thus placing SCR 22 and SCR 20 in a reverse-connected configuration capable of controlling current flow in either direction from supply line 14 to motor 10. Also connected in parallel with SCR 20 and SCR 22 is a series combination of resistor 24 and capacitor 26; metal oxide varistor 28 is also connected in parallel with SCR 20 and SCR 22. Resistor 24, capacitor 26 and metal oxide varistor 28 are intended primarily for noise suppression.

Similarly, a second control means, generally designated 30 in FIG. 1, is connected in series between a second supply line 32 and the motor 10. A second voltage sensing means including lines 34 and 36 is connected across the second control means 30 mentioned above. Such a connection permits the measurement of the back emf across the second control means 30 whenever the second control means 30 is electrically open. Second control means 30 includes SCR 38, the anode of which is connected to second supply line 32 and the cathode of which is connected to motor 10. Second control means 30 also includes SCR 40, the cathode of which is connected to second supply line 32 and the anode of which is connected to motor 10, thus placing SCR 38 and SCR 40 in a reverse-connected configuration capable of controlling current flow in either direction from supply line 32 to motor 10. Also connected in parallel with SCR 38 and SCR 40 is a series combination of resistor 42 and capacitor 44; metal oxide varistor 46 is also connected in parallel with SCR 38 and SCR 40. Resistor 42, capacitor 44 and metal oxide varistor 46 are intended primarily for noise suppression.

The third phase is similar in that a third control means, generally designated 48 in FIG. 1, is connected in series between a third supply line 50 and the motor 10. A third voltage sensing means including lines 52 and 54 is connected across the third control means 48 mentioned above. Such a connection permits the measurement of the back emf across the third control means 48 whenever the third control means 48 is electrically open. Third control means 48 includes SCR 56, the anode of which is connected to third supply line 50 and the cathode of which is connected to motor 10. Third control means 48 also includes SCR 58, the cathode of which is connected to third supply line 50 and the anode of which is connected to motor 10, thus placing SCR 56 and SCR 58 in a reverse-connected configuration capable of controlling current flow in either direction from supply line 50 to motor 10. Also connected in parallel with SCR 56 and SCR 58 is a series combination of resistor 60 and capacitor 62; metal oxide varistor 64 is also connected in parallel with SCR 56 and SCR 58. Resistor 60, capacitor 64 and metal oxide varistor 64 are intended primarily for noise suppression.

A first crossover reference means, generally designated 66 in FIG. 1, is also connected to first supply line 14. First crossover reference means 66 includes resistor 68 which is directly connected to first supply line 14. The remaining terminal of resistor 68 is connected to capacitor 70, resistor 72 and resistor 74. The remaining terminals of capacitor 70 and resistor 72 are connected to ground. The remaining terminal of resistor 74 is connected to the anode of diode 76, the cathode of diode 78, and first phase control means 80. The cathode of diode 76 and the anode of diode 78 within first crossover reference means 66 are connected to ground.

Similarly, a second crossover reference means, generally designated 82 in FIG. 1, is connected to second supply line 32. Second crossover reference means 82 includes resistor 84 which is directly connected to second supply line 32. The remaining terminal of resistor 84 is connected to capacitor 86, resistor 88 and resistor 90. The remaining terminals of capacitor 86 and resistor 88 are connected to ground. The remaining terminal of resistor 90 is connected to the anode of diode 92, the cathode of diode 94, and second phase control means 96. The cathode of diode 92 and the anode of diode 94 within second crossover reference means 82 are connected to ground.

A third crossover reference means, generally designated 98 in FIG. 1, is similarly connected to third supply line 50. Third crossover reference means 98 includes resistor 100 which is directly connected to third supply line 50. The remaining terminal of resistor 100 is connected to capacitor 102, resistor 106. The remaining terminals of capacitor 102 and resistor 104 are connected to ground. The remaining terminal of resistor 106 is connected to the anode of diode 108, the cathode of diode 110, and third phase control means 112. The cathode of diode 108 and the anode of diode 110 within third crossover reference means 98 are connected to ground.

First phase control means 80 accepts phase control signal 114 in addition to the output of first crossover reference means 66 in order to create the signal input for the first driver means, generally designated 116 in FIG. 1. Similarly, second phase control means 96 accepts phase control signal 114 in addition to the output of second crossover reference means 82 for the purpose of generating signals for driving second driver means 118, and third phase control means 112 also accepts phase control signal 114 in addition to the output of third crossover reference means 98 to produce the signal necessary to drive third driver means 120.

Phase control enable means 122 provides the phase control enabling signal 124 which is also accepted as an input by first phase control means 80, second phase control means 96, and third phase control means 112.

The first driver means, generally designated as 116 in FIG. 1, includes all signal processing components between first phase control means 80 and first control means 12. The two outputs of first phase control means 80 are accepted by flip flops 126 and 128; these flip flops are hex type D flip flops which also accept a first clock signal 130 and a second clock signal 132 phase shifted from the first clock signal 130, both clock signals being derived from oscillator means 134. Flip flops 126 and 128 are of the type typically used for driving SCR control circuits. The output put of flip flop 126 is conducted through resistor 136 to the base of transistor pair 138 connected in the Darlington configuration as shown in FIG. 1. Bypass capacitor 140 is connected between the output of resistor 136 and the final emitter of transistor pair 138, which is also connected to ground. The collector output of transistor pair 138 is used to drive the primary of transformer 142 which is suppressed by diode 144. Power for transistor pair 138 is derived from a +20 VDC source as shown in FIG. 1, which source is connected to resistor 146 in parallel with a series combination of resistor 148 and capacitor 150, the output of which is connected to resistor 152. The remaining terminal of resistor 152 is connected to capacitor 154, the other side of which is grounded. This arrangement, as shown in FIG. 1, provides the necessary filtering for the +20 VDC power source. Similarly, the output of flip flop 128 is conducted through resistor 156 to the input of transistor pair 158. Bypass capacitor 160 is connected between the output of resistor 156 and ground. The final emitter of transistor pair 158 is also connected to ground. The output from transistor pair 158 is taken from the common collector connection of the pair to conduct a driving signal to the primary of transformer 162, which is suppressed by diode 164.

The several transistor pairs referred to herein are each identical elements essentially comprising a pair of NPN transistors connected in the Darlington configuration, the base of the first transistor serving as the input to the pair, providing a high impedance input. The emitter of the first transistor is connected directly to the base of the second transistor of the pair, and the emitter of the second transistor is connected to ground. The collector of the first transistor in each transistor pair is connected to the output of the transistor pair, as is the collector of the second transistor in each transistor pair.

The output of transformer 142 is connected to the anode of diode 166, the cathode of which is connected to the gate of SCR 22. Gate suppression is provided by capacitor 168, resistor 170, and diode 172, all three components being connected together in parallel and connected to the gate of SCR 22 such that the cathode of diode 172 is directly connected to the gate of SCR 22; the remaining sides of capacitor 168, resistor 170, and the anode of diode 172 are all connected to the first supply line 14. In an identical fashion, the output of transformer 162 is connected to the anode of diode 174, the cathode of which is connected to the gate of SCR 20. Gate suppression of SCR 20 is accomplished by connecting one side of capacitor 176, resistor 178 and the cathode of diode 180 to the gate of SCR 20. The remaining sides of capacitor 176, resistor 178 and the anode of diode 180 are connected to the cathode of SCR 20.

Similarly, the second driver means, generally designated as 118 in FIG. 1, includes all signal processing components between second phase control means 96 and second control means 30. The two outputs of second phase control means 96 are accepted by flip flops 182 and 184; these flip flops are hex type D flip flops which also accept a first clock signal 130 and a second clock signal 132 phase shifted from the first clock signal 130, both clock signals being derived from oscillator means 134 the frequency of which is substantially higher than the line frequency. Flip flops 182 and 184 are of the type typically used for driving SCR control circuits. The output of flip flop 182 is conducted through resistor 186 to the base of transistor pair 188 as shown in FIG. 1. Bypass capacitor 190 is connected between the output of resistor 186 and the final emitter of transistor pair 188, which is also connected to ground. The collector output of transistor pair 188 is used to drive the primary of transformer 192 which is suppressed by diode 194. Power for transistor pair 188 is derived from a +20 VDC source as shown in FIG. 1, just as in the first driver means 116. Similarly, the output of flip flop 184 is conducted through resistor 196 to the base of transistor 198. Bypass capacitor 200 is connected between the output of resistor 196 and ground. The final emitter of transistor pair 198 is also connected to ground. The output from transistor pair 198 is taken from the common collectors of the pair, and is used to drive transformer 202 which is suppressed by diode 204. The output of transformer 192 is connected to the anode of diode 206, the cathode of which is connected to the gate of SCR 40. Gate suppression is provided by capacitor 208, resistor 210, and diode 212, all three components being connected together in parallel and connected to the gate of SCR 40 such that the cathode of diode 212 is directly connected to the gate of SCR 40; the remaining sides of capacitor 208, resistor 210, and the anode of diode 212 are all connected to the first supply line 32. In an identical fashion, the output of transformer 202 is connected to the anode of diode 214, the cathode of which is connected to the gate of SCR 38. Gate suppression of SCR 38 is accomplished by connecting one side of capacitor 216, resistor 218 and the cathode of diode 220 to the gate of SCR 38. The remaining sides of capacitor 216, resistor 218 and the anode of diode 220 are connected to the cathode of SCR 38.

The third driver means, generally designated as 120 in FIG. 1, similarly includes all signal processing components between third phase control means 112 and third control means 48. The two outputs of third phase control means 112 are accepted by flip flops 222 and 224; these flip flops are hex type D flip flops which also accept a first clock signal 130 and a second clock signal 132 phase shifted from the first clock signal 130, both clock signals being derived from oscillator means 134. Flip flops 222 and 224 are of the type typically used for driving SCR control circuits. The output of flip flop 222 is conducted through resistor 226 to the base of transistor pair 228 as shown in FIG. 1. Bypass capacitor 230 is connected between the output of resistor 226 and the final emitter of transistor pair 228, which is also connected to ground. The collector output of transistor pair 228 is used to drive the primary of transformer 232 which is suppressed by diode 234. Power for transistor pair 228 is derived from a +20 VDC source is shown in FIG. 1, just as in the first driver means 116. Similarly, the output of flip flop 224 is conducted through resistor 236 to the base of the first transistor in transistor pair 238. Bypass capacitor 240 is connected between the output side of resistor 236 and ground. The final emitter of transistor pair 238 is also connected to ground. The output from transistor pair 238 is taken from the common collector connection of the two transistors in transistor pair 238, and is used to drive the primary of transformer 242 which is suppressed by diode 244. The output of transformer 232 is connected to the anode of diode 246, the cathode of which is connected to the gate of SCR 58. Gate suppression is provided by capacitor 248, resistor 250, and diode 252, all three components being connected together in parallel and connected to the gate of SCR 58 such that the cathode of diode 252 is directly connected to the gate of SCR 58; the remaining sides of capacitor 248, resistor 250, and the anode of diode 252 are all connected to the third supply line 50. In an identical fashion, the output of transformer 242 is connected to the anode of diode 254, the cathode of which is connected to the gate of SCR 56. Gate suppression of SCR 56 is accomplished by connecting one side of capacitor 256, resistor 258 and the cathode of diode 260 to the gate of SCR 56. The remaining sides of capacitor 256, resistor 258 and the anode of diode 260 are connected to the cathode of SCR 56.

Current sensing means including current transformer 262 is also used in this motor control apparatus for sensing current drawn by the motor 10. As shown in FIG. 1 the current transformer 262 is associated with the second supply line 32. Information concerning current drawn by the motor 10 is transmitted from current transformer 262 by means of lines 264 and 266.

Figure 2:
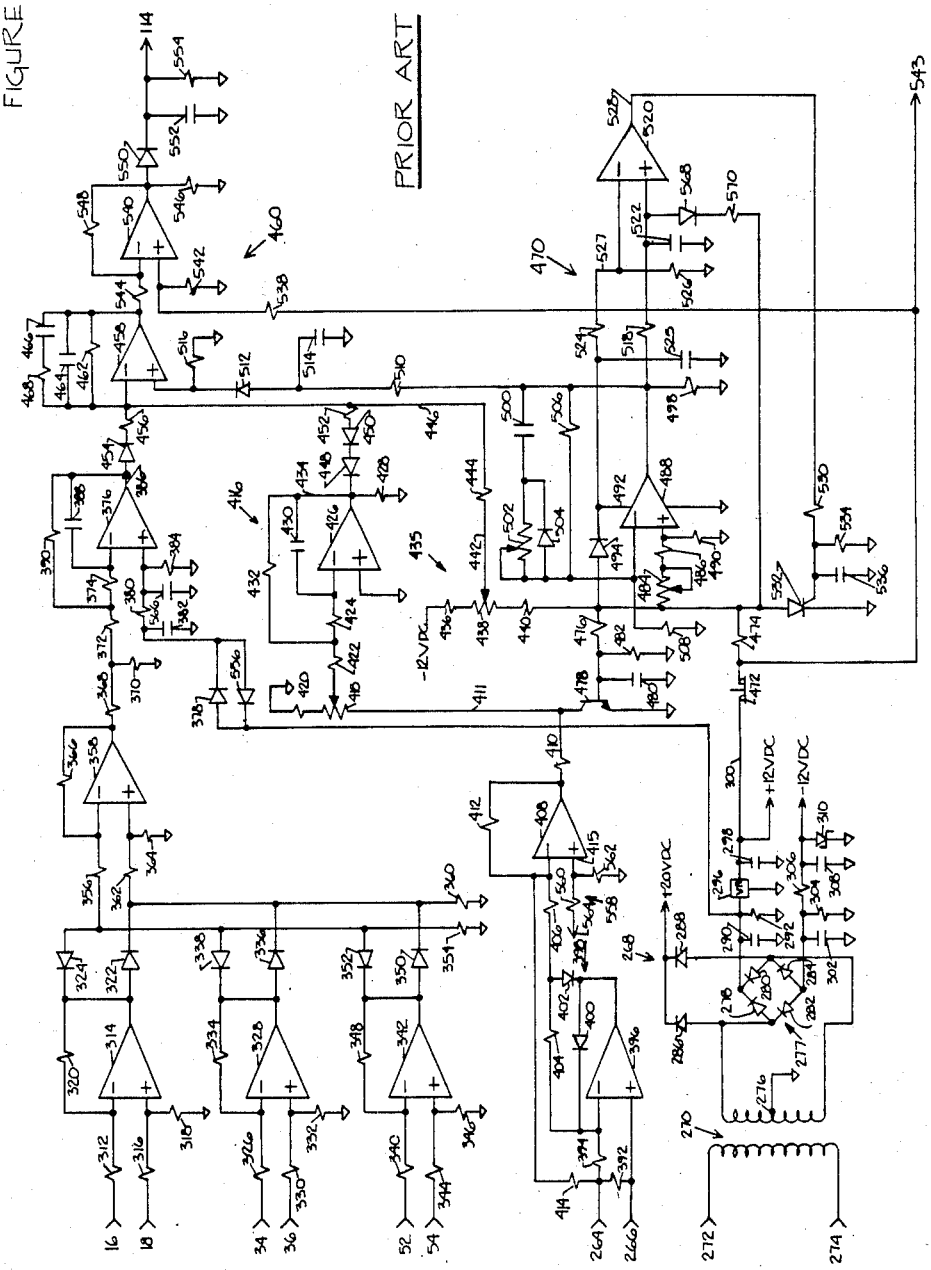
FIG. 2 is a schematic diagram showing the prior art comparator means and starting control means.

FIG. 2 is a schematic showing the comparator means and starting control means known in the prior art. Since the instant invention involves improvements in four distinct areas over this prior art, a detailed discussion of the prior art as shown in FIG. 2 applies essentially equally to the instant invention with the exception of the four specific areas to which modifications have been made and which are subsequently described in greater detail. As shown in FIG. 2, power supply means 268 includes transformer 270, the input lines of which are designated 272 and 274; lines 272 and 274 are connected to a source of line voltage such as first supply line 14 and second supply line 32 as shown previously in FIG. 1. The secondary of transformer 270 has a center tap 276 which is grounded. The output of transformer 270 is connected to a conventional full wave bridge rectifier generally designated 277 which comprises diodes 278, 280, 282 and 284 connected in the conventional full wave bridge rectifier configuration. An unregulated +20 VDC output is taken through diodes 286 and 288. A reference voltage signal 294 is taken from the positive side of the full wave bridge rectifier 277; capacitor 290 and resistor 292 are connected from the same point to ground to provide filtering. Voltage regulator 296 is also connected between the same point and ground for providing a +12 VDC source 300 which is additionally filtered by capacitor 298. The negative side of full wave bridge rectifier 277 is connected to capacitor 302, resistor 304, and resistor 306. The remaining sides of capacitor 302 and 304 are connected to ground for filtering. The remaining side of resistor 306 is connected to capacitor 308 and the anode of zener diode 310 for providing a −12 VDC source. The remaining side of capacitor 308 and the cathode of zener diode 310 are connected to ground.

As mentioned previously in connection with FIG. 1, lines 16 and 18 are connected across first control means 12 for sensing the back emf across first control means 12. As shown in FIG. 2, line 16 is connected to resistor 312, the other side of which is connected to the negative input of comparator 314 which is part of the first voltage sensing means. Similarly, line 18 is connected to resistor 316, the other side of which is connected to resistor 318 and the positive input of comparator 314. The remaining side of resistor 318 is connected to ground. The output of comparator 314 is connected through feedback resistor 320 to the negative input of comparator 314. The output of comparator 314 is also connected to the anode of diode 322 and to the cathode of diode 324. For the second phase, line 34 is connected to one side of resistor 326, the other side of which is connected to the negative input of comparator 328 which is included within the second voltage sensing means. Line 36 is connected to one side of resistor 330, the other side of which is connected to the positive input of comparator 328 and to one side of resistor 332. The other side of resistor 332 is connected to ground. The output of comparator 328 is conducted through feedback resistor 334 to the negative input of comparator 328. The output of comparator 328 is also connected to the anode of diode 336 and the cathode of diode 338. The third phase is treated in a similar fashion in that line 52 is connected to one side of resistor 340, the other side of which is connected to the negative input of comparator 342 which is included within the third voltage sensing means. Line 54 is connected to one side of resistor 344, the other side of which is connected to the positive input of comparator 342 and to one side of resistor 346. The other side of resistor 346 is connected to ground. The output of comparator 342 is conducted through feedback resistor 348 to the negative input of comparator 342. The output of comparator 342 is also connected to the anode of diode 350 and to the cathode of the diode 352. The anodes of diodes 324, 338 and 352 are connected to resistor 354 and resistor 356. The other side of resistor 354 is connected to ground, while the remaining side of resistor 356 is connected to the negative input of summing amplifier 358. The cathodes of diodes 322, 336 and 350 are connected to one side of resistor 360 and resistor 362. The other side of resistor 360 is connected to ground while the remaining side of resistor 362 is connected to the positive input of summing amplifier 358 and to one side of resistor 364. The other side of resistor 364 is connected to ground. The output of summing amplifier 358 is conducted through feedback resistor 366 to the negative input of summing amplifier 358. The output of summing amplifier 358 is connected to one side of resistor 368 which is the input of a voltage divider comprising resistors 368 and 370. The other side of resistor 368 is connected to resistor 370 and one side of resistor 372. The other side of resistor 370 is connected to ground. The attenuated output of summing amplifier 358 is then conducted through resistor 372 and resistor 374 in series with resistor 372 to the negative input of first comparator means 376. Reference voltage signal 294 derived from power supply means 268 is connected to the anode of diode 378, the cathode of which is connected to one side of resistor 380 and capacitor 382. The other side of capacitor 382 is connected to ground. The remaining side of resistor 380 is connected to the positive input of first comparator means 376 and to one side of resistor 384. The other side of resistor 384 is connected to ground so that the combination of resistors 380 and 384 form a voltage divider. Voltage control signal 386 is present at the output of first comparator means 376 which is connected to one side of feedback capacitor 388 and to one side of feedback resistor 390. The remaining side of capacitor 388 is connected to the negative input of first comparator means 376. The remaining side of resistor 390 is connected to the junction of resistors 372 and 374 previously mentioned.

Current sensing means comprising current transformer 262 as previously mentioned in connection with FIG. 1 provides a signal which is conducted by lines 264 and 266 to each side of resistor 392 for impedance matching purposes within the rectifier means generally designated 398 in FIG. 2. Line 264 is also connected to one side of resistor 394, the other side of which is connected to the negative input of comparator 396. Line 266 is also connected directly to the positive input of comparator 396. The output of comparator 396 is connected to the anode of diode 400 and to the cathode of diode 402. The cathode of diode 400 is connected to the negative input of comparator 396. The anode of diode 402 is connected to one side of resistor 404, the other side of which is connected to the negative input of comparator 396. The output of rectifier means 398 is taken from the anode of diode 402 and conducted through resistor 406 to the negative input of third comparator means 408. Positive input 415 to third comparator means 408 is directly connected to ground. Resistor 410 is connected to the output of third comparator means 408; current signal 411 is present on the output side of resistor 410. The output of third comparator means 408 is also conducted through feedback resistor 412 to the negative input of third comparator means 408. Additional feedback is accomplished by connecting the negative input of third comparator means 408 to one side of resistor 414, the other side of which is connected to line 264 coming from current transformer 262. The value of resistor 412 is selected to compensate for variations in characteristics of transformer used for current transformer 262.

Limiting means generally designated 416 in FIG. 2 includes potentiometer 418 and comparator 426 and the related circuitry for limiting the effects of current signal 411 on the motor control apparatus of the instant invention. Current signal 411 from the output of resistor 410 is conducted to one side of potentiometer 418. The other side of potentiometer 418 is connected to resistor 420 and the other side of resistor 420 is connected to ground. An attenuated current signal is taken from the wiper of potentiometer 418 and conducted through resistor 422 and thence through resistor 424 in series to the negative input of comparator 426. The output of comparator 426 is connected to resistor 428, the other side of which is connected ground. The output of comparator 426 is also connected to one side of feedback capacitor 430 and to one side of feedback resistor 432. The other side of capacitor 430 is connected to the negative input of comparator 426. The remaining terminal of resistor 432 is connected to the junction of resistors 422 and 424. The output of comparator 426 is current control signal 434.

A voltage divider generally designated 435 in FIG. 2 is created by the series combination of resistor 436, potentiometer 438 and resistor 440. One side of resistor 436 is connected to the −12 VDC source, while the other side of resistor 436 is connected to one side of potentiometer 438. The other side of potentiometer 438 is connected to resistor 440, the other side of which is connected to the output side of resistor 474 and to the anode of SCR 532. The +12 VDC source 300 previously mentioned is conducted through switch 472 to the input side of resistor 474. A minimum voltage reference signal 442 is present at the wiper of potentiometer 438, which is connected to one side of resistor 444. The output side of resistor 444 is connected bus 446. Current control signal 434 from the output of comparator 426 is conducted to the cathode of diode 448, the anode of which is connected to the cathode of diode 450. The anode of diode 450 is connected to resistor 452, the other side of which is also connected to bus 446. Voltage control signal 386 from the output of first comparator means 376 is conducted to the anode of diode 454, the cathode of which is connected to resistor 456. The remaining side of resistor 456 is also connected to bus 446, which is connected to the negative input of comparator 458 which is part of the second comparator means generally designated 460 in FIG. 2. The output of comparator 458 is connected to one side of feedback resistor 462, one side of feedback capacitor 464 and one side of capacitor 466. The remaining sides of resistor 462 and capacitor 464 are connected to the negative input of comparator 458. The remaining side of capacitor 466 is connected to resistor 468, the remaining side of which is also connected to the negative input of comparator 458.

Starting control means generally designated 470 in FIG. 2 is also included for providing a soft start for the motor 10. The +12 VDC source 300, as previously mentioned, is conducted through push button reset switch 472 to one side of resistor 474, the other side of which is connected to resistor 476. The remaining side of resistor 476 is connected to the base of NPN transistor 478. The emitter of transistor 478 is connected to ground, while the collector of transistor 478 is connected to the output side of resistor 410 where current signal 411 is present. Upon energizing the motor control apparatus, a positive voltage is conducted from the +12 VDC source 300 through switch 472, resistor 474, and resistor 476 to the base of transistor 478 to cause transistor 478 to switch to the ON condition, thus shorting current signal 411 to ground. Capacitor 480 and resistor 482 are connected in parallel between the base of transistor 478 and ground. Adjustable time control means in the form of variable resistor 484 is connected to the output side of resistor 474 to receive the positive voltage present at that point at the beginning of the starting interval. The remaining side of variable resistor 484 is connected to resistor 486, the other side of which is connected to the positive input of comparator 488. The positive input of comparator 488 is also connected to resistor 490, the other side of which is connected to ground. The positive supply voltage 492 for comparator 488 is also derived from the output of resistor 474, which is connected to the anode of diode 494; the cathode of diode 494 provides the positive supply voltage 492 for comparator 488. The output of comparator 488 is starting ramp signal 496 which is developed across resistor 498 which is connected between the output of comparator 488 and ground. Capacitor 500 is also connected to the output of comparator 488 and is charged by the starting ramp signal 496 during the starting interval. The other side of capacitor 500 is connected to one side of variable resistor 502 which functions as an adjustable torque control means, and also to the cathode of diode 54. The remaining side of variable resistor 502 and the anode of diode 504 are connected to the negative input of comparator 408. Also connected to the output of comparator 488 is feedback resistor 506 the other side of which is connected to the negative input of comparator 488. Resistor 508 is connected between the negative input of comparator 488 and ground. Starting ramp signal 496 is conducted through resistor 510 to the anode of diode 512, which is also connected to capacitor 514, the other side of which is connected to ground. The cathode of diode 512 is connected to the positive input of comparator 458 previously mentioned. The positive input of comparator 458 is also connected to ground through resistor 516. Starting ramp signal 496 is conducted through resistor 518 directly to the positive input of fourth comparator means 520. The output side of resistor 518 is also connected to capacitor 522, the other side of which is connected to ground. Positive supply voltage 492 which was used for comparator 488 is also conducted through resistor 524 to the negative input of fourth comparator means 520. The input side of resistor 524 is connected to capacitor 525, the other side of which is connected to ground. Also connected to the negative input of fourth comparator means 520 is resistor 526, the other side of which is connected to ground. The arrangement of resistors 524 and 526 operate upon positive supply voltage 492 to provide a fixed voltage reference 527 for the negative input of fourth comparator means 520. At the positive input of fourth comparator means 520, resistor 518 and capacitor 522 form a type of delay network for the starting ramp signal 496. Fourth comparator means 520 thus compares a delayed form of starting ramp signal 496 with fixed voltage reference 527 to produce a run signal 528 which is conducted through resistor 530 to the gate of SCR 532. Resistor 534 and capacitor 536 are connected in parallel between the gate of SCR 532 and ground. The cathode of SCR 532 is connected to ground also as shown in FIG. 2.

Resistor 538 conducts a +12 VDC source from the output side of switch 472 to the positive input of comparator 540. Resistor 542 is connected between the positive input of comparator 540 and ground to attenuate this input. The +12 VDC source 543 from the output side of switch 472 is also taken for use in the phase control enable means shown subsequently in FIG. 4. The output of comparator 458 as previously discussed is conducted through resistor 544 to the negative input of comparator 540. The output of comparator 540 is connected to resistor 546, the other side of which is connected to ground. The output of comparator 540 is also connected to feedback resistor 548, the other side of which is connected to the negative input of comparator 540. The output of comparator 540 is connected to the anode of diode 550, the cathode of which is connected to capacitor 552 and resistor 554 in parallel, the other side of capacitor 552 and resistor 554 being connected to ground. At the cathode of diode 550 is the phase control signal 114, which is used by the various phase control means as shown previously in FIG. 1.

Figure 3:
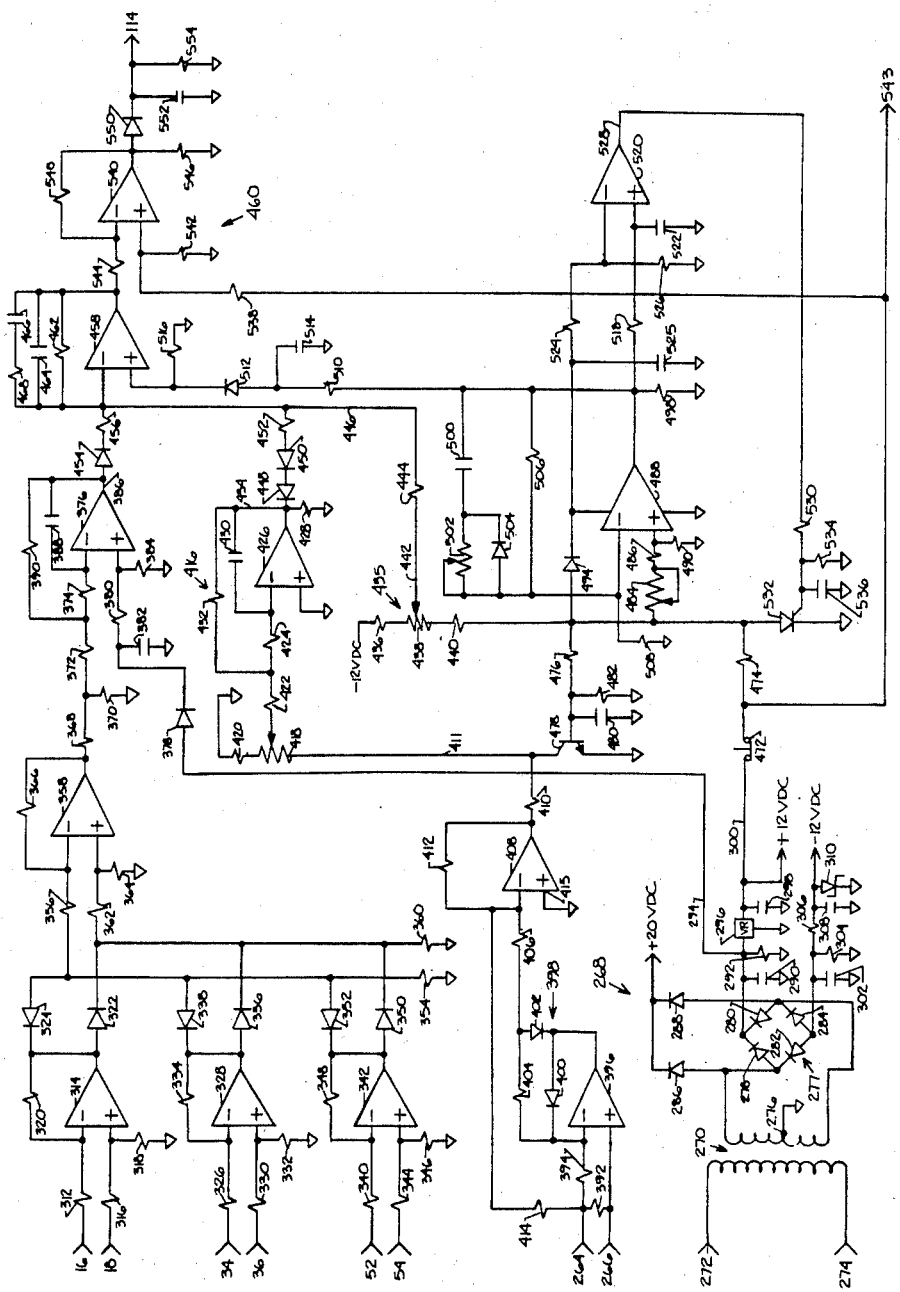
FIG. 3 is a schematic showing the improved comparator means and starting control means.

FIG. 3 is a schematic of the improved comparator means and starting control means of the instant invention. It is identical in structure and function to the circuit disclosed in the prior art schematic diagram in FIG. 2, with the exception of four areas which are discussed below; therefore the above discussion of the circuit shown in FIG. 2 also applies to the circuit of FIG. 3, with the following four exceptions. As was mentioned in the schematic of FIG. 2, the reference voltage signal 294 from power supply means 268 is conducted through diode 378 and resistor 380 to the positive input of first comparator means 376. A modification to this circuit is shown in FIG. 3 by the addition of diode 556 in parallel with diode 378; however, the cathode of diode 556 is connected to the anode of diode 378, and the anode of diode 556 is connected to the cathode of diode 378 thus forming a pair of reverse-connected diodes. As discussed previously in connected with FIG. 2, summing amplifier 358 sums the output of the three voltage sensing means, and first comparator means 376 compares the output of summing amplifier 358 with a reference voltage signal 294 which is representative of line voltage. Due to the unidirectional nature of diode 378, the response of the motor control apparatus to changes in line voltage was also somewhat unidirectional in that the motor control apparatus tended to respond more rapidly to increases in line voltage than to decreases in line voltage. The addition of diode 556 in parallel with diode 378 in a reverse-connected configuration increases the sensitivity of the motor control apparatus to decreases in line voltage so that the motor control apparatus is approximately equally sensitive to changes in line voltage in either direction.

The second improvement over the prior art involves the positive input to third comparator means 408 which is used to accept the output of rectifier means 398 to produce current signal 411. In the prior art, positive input 415 to third comparator means 408 was connected to a ground reference as previously mentioned. In the improved circuit, positive input 415 to third comparator means 408 is connected to the output of voltage divider 558 which comprises resistors 560 and 562. The output of voltage divider 558 is from the junction of resistors 560 and 562, and is connected directly to positive input 415 of the third comparator means 408. The other side of resistor 562 is connected to ground. The input 564 of resistor 560 may be connected to either a positive or negative voltage supply, and the values of resistors 560 and 562 may be selected as desired to provide the desired fixed reference at positive input 415 of third comparator means 408. This improvement greatly increases the ability of the motor control apparatus to accommodate variations in the output of the current transformer 262 used as a current sensing means.

A third improvement consists of the addition of capacitor 566 to the output of the voltage divider connected to the positive input of first comparator means 376. The voltage divider is comprised of resistors 380 and 384, with the input being at one end of resistor 380, and the output being taken from the junction of resistors 380 and 384 and connected to the positive input of first comparator means 376. Capacitor 566 is connected across resistor 384 thus placing capacitor 566 between the output of the voltage divider and ground. The addition of capacitor 566 provides additional ripple filtering for reference voltage signal 294 which is derived from an unregulated output of power supply means 268. This improvement results in increased stability of phase control signal 114 and increased balance between the three voltages ultimately supplied to the motor 10.

A fourth improvement lies in the area of the positive input to the fourth comparator means 520. The anode of diode 568 is connected to the positive input of fourth comparator means 520, and the cathode of diode 568 is connected to resistor 570, the other end of which is connected to the anode of SCR 532. This series combination of diode 568 and resistor 570 provides a discharge path for the discharge of capacitor 522 at the end of the starting interval when SCR 532 fires and starting control means 470, including a fourth comparator means 520, is deactivated. The addition of the discharge path comprising diode 568 and resistor 570 serves to prevent input overload of fourth comparator means 520 and thus prolong the life of fourth comparator means 520.

FIG. 4 is a schematic of the phase control enable means generally designated 122 previously in FIG. 1. Phase control enable means 122 comprises inverter 572, capacitor 574 and resistor 576. Inverter 572 is powered by the +12 VDC source 543 derived from the output side of switch 472 at the output of power supply means 268 as shown previously in FIGS. 2 and 3. An input signal for inverter 572 is created by the combination of capacitor 574 and resistor 576. One side of capacitor 574 is connected to a +12 VDC source, and the other side of capacitor 574 is connected to resistor 576 which is grounded at its other end. The input to inverter 572 is taken from the junction of capacitor 574 and resistor 576. The output of inverter 572 is phase control enabling signal 124 which is at a low level when power is initially turned on but which rises to a relatively high level after a short delay due to the action of capacitor 574 at the input of inverter 572. This enabling delay insures stability of the various circuits in the motor control apparatus prior to energizing the three phase control means 80, 96 and 112 as shown in FIG. 1.

FIG. 5 is a schematic diagram of the oscillator means generally designated 134 in FIG. 1. Oscillator means 134 includes three inverters 578, 580 and 582 connected in series. The output of inverter 582 is conducted through resistors 584 and 586 in series back to the input of inverter 578. Capacitor 588 is connected between the junction of resistors 584 and 586 and the input of inverter 582. The resulting loop circuit is unstable and tends to oscillate at a frequency significantly higher than line frequency, producing a first clock signal 130 as an oscillator output used as an input in the various driver means shown in FIG. 1. First clock signal 130 is also connected to the input of inverter 590, the output of which is phase shifted by resistor 592 and capacitor 594 and then conducted to the input of inverter 596. One side of resistor 592 is connected directly to the output of inverter 590, while the other side of resistor 592 is connected to the input of inverter 596 and to one side of capacitor 594, the other side of which is grounded. The output of inverter 596 is thus a second clock signal 132 phase shifted from the first clock signal 130. The second clock signal 132 is also used as an input to the various driver means shown in FIG. 1.

In operation after the starting interval, the three control means 12, 30 and 48 shown in FIG. 1 control current flow in each direction from the three supply lines 14, 32, and 50 to the motor 10. When the control means 12, 30 and 48 are electrically closed so as to conduct current from supply lines 14, 32 and 50 to the motor 10, the voltage sensed across the various control means on line pairs 16–18, 34–36, and 52–54 will be essentially zero. However, when the various control means are electrically opened, line pairs 16–18, 34–36, and 52–54 will present the back emf across the control means 12, 30 and 48 respectively. As shown in FIGS. 2 and 3, the back emf signals from line pairs 16–18, 34–36, and 52–54 are conducted to the inputs of comparators 314, 328 and 342 respectively which are included within the first, second and third voltage sensing means. The outputs of the first, second and third voltage sensing means are summed by summing amplifier 358 and then compared with reference voltage signal 294 from power supply means 268 in first comparator means 376 to produce voltage control signal 386. As shown in FIG. 3, the improvement consisting of the addition of diode 556 in parallel with diode 378 at the input of first comparator means 376 to create a reverseconnected pair of diodes provides more equal sensitivity to supply voltage changes in both directions. A further improvement is the addition of capacitor 566 at the positive input of first comparator means 376 for additional ripple filtering of reference voltage signal 294. Reference voltage signal 294 is derived from an unregulated output of power supply means 268 and is representative of line voltage, thus permitting the motor control apparatus to maintain a constant motor speed in motor 10 even when variations occur in the line voltage. A means of detecting the load on the motor 10 is the current sensing means comprising current transformer 262 associated with one of the supply lines as shown in FIG. 1. The signals from current transformer 262 are conducted by lines 264 and 266 to rectifier means 398 which is used in conjunction with third comparator means 408 to develop current signal 411. By selecting the value of feedback resistor 412, some compensation for variation in the output of current transformer 262 due to differences in various samples of such transformers is available. In the improved circuit shown in FIG. 3, additional compensation is provided by the use of voltage divider 558, wherein the values of resistors 560 and 562 are selectable, and the input 564 to voltage divider 558 is also a selectable voltage source, all permitting a greater range of compensation to account for variations in different samples of current transformer 262. Current signal 411 is processed through limiting means 416 which includes potentiometer 418 which serves as a maximum voltage adjustment for the motor control apparatus. The minimum voltage adjustment is performed by potentiometer 438 as shown in FIGS. 2 and 3. Voltage control signal 386, current control signal 434, and minimum voltage reference signal 442 are summed on bus 446 and subsequently processed through comparator 458 and comparator 540 which is referenced to the +12 VDC source 543, and which ultimately produces the phase control signal 114 as an output. Phase control signal 114 is used as shown in FIG. 1 to control the three phase control means 80, 96 and 112. Referring to FIG. 1, it is seen that the three phase control means 80, 96 and 112 respectively receive information from first, second and third crossover reference means 66, 82 and 98 as well as the phase control signal 114. Phase control means 80, 96, and 112 respectively control driver means 116, 118 and 120 which serve to control the various SCR components within control means 12, 30 and 48 respectively. Clock signals 130 and 132 produced by oscillator means 134 are used as inputs to the flip flops within driver means 116, 118 and 120 in order to provide a plurality of firing signals for the various SCR components in control means 12, 30 and 48 to avoid an SCR being inadvertently turned off by noise on the supply lines 14, 32 or 50, or by noise generated elsewhere in the circuit. Within each of the control means 12, 30 and 48 is a pair of reverse-connected SCR components in parallel with each other but in series between the respective supply line and the motor 10. The phase control means for any given phase controls the controls means for that phase through the intermediate driver means so as to maintain constant motor speed of the motor 10, regardless of load on the motor 10 and regardless of variations in supply line voltage.

A soft start for the motor 10 is provided by starting control means 470 shown in FIG. 3. When the circuit is initially activated SCR 532 is turned off and the relatively positive voltage presented to the base of transistor 478 causes transistor 478 to turn on thus grounding current signal 411. During the starting interval, comparator 488 and capacitor 500 cooperate to produce starting ramp signal 496 which gradually increases in amplitude for providing the soft start to the motor 10. The timed duration of the starting interval is controlled by the setting of the adjustable time control means comprising variable resistor 484. As the amplitude of the starting ramp signal 496 controls the torque of the motor during the starting interval, the rate of charge of capacitor 500 is controlled by an adjustable torque control means comprising variable resistor 502 during that starting interval. Starting ramp signal 496 is processed by comparator 458 to produce ultimately a phase control signal 114 during the starting interval. Starting ramp signal 496 is also conducted to fourth comparator means 520 through a delay network comprising resistor 518 and capacitor 522. When a predetermined value of the starting ramp signal is reached in comparison with fixed voltage reference 527, fourth comparator means 520 produces run signal 528 which serves to turn on SCR 532. When SCR 532 turns on, this action effectively grounds the output of resistor 474 and the base of transistor 478, thus turning off transistor 478. Current signal 411 is then no longer grounded, and is then processed by limiting means 416. The firing of SCR 532 also disables the power input to the starting control means 470, which action terminates the end of the starting interval and enables the beginning of the run mode of the motor control apparatus. Diode 568 and resistor 570 provide a discharge path for capacitor 522 to avoid damage to fourth comparator means 520 when starting control means 470 is deactivated.

The present disclosure includes that contained in the appended claims as well as that of the foregoing description. Although the invention has been described in its preferred form with a certain degree of particularity, it is understood that the present invention of the preferred form has been made only by way of example, that numerous changes in the details of construction and the combination and arrangement of parts may be resorted to without departing from the spirit and scope of the invention.

What is claimed is:

1. A motor control apparatus for a 3-phase induction motor comprising in combination:
   a first control means connected in series with a first supply line;
   a first voltage sensing means connected across said first control means for sensing the back emf across said first control means when said first control means is open;
   a first crossover reference means connected to the input of said first control means;

a second control means connected in series with a second supply line;

a second voltage sensing means connected across said second control means for sensing the back emf across said second control means when said second control means is open;

a second crossover reference means connected to the input of said second control means;

a third control means connected in series with a third supply line;

a third voltage sensing means connected across said third control means for sensing the back emf across said third control means when said third control means is open;

a third crossover reference means connected to the input of said third control means;

a summing amplifier for summing the output of said first voltage sensing means, said second voltage sensing means and said third voltage sensing means;

a power supply means for developing a reference voltage signal representative of line voltage;

a first comparator means for comparing the output of said summing amplifier with said reference voltage signal for developing a voltage control signal wherein said reference voltage signal is conducted to said first comparator means through a pair of reverse-connected diodes;

current sensing means associated with a supply line for sensing current drawn by the motor;

rectifier means connected to said current sensing means for developing a current signal representative of current drawn by the motor;

limiting means for limiting the magnitude of said current signal and for producing a current control signal;

a first voltage divider connected across positive and negative voltage sources for producing a minimum voltage reference signal;

a second comparator means for comparing said voltage control signal with said current control signal and with said minimum voltage reference signal for developing a phase control signal;

a first phase control means for comparing said phase control signal with the output of said first crossover reference means;

a second phase control means for comparing said phase control signal with the output of said second crossover reference means;

a third phase control means for comparing said phase control signal with the output of said third crossover reference means;

a first driver means for accepting the output of said first phase control means and for controlling said first control means;

a second driver means for accepting the output of said second phase control means and for controlling said second control means;

a third driver means for accepting the output of said third phase control means and for controlling said third control means;

starting control means for providing a soft start for the motor;

a second voltage divider;

a third comparator means for comparing the output of said second voltage divider with the output of said rectifier means for producing said current signal; and oscillator means for excitation of said first driver means, said second driver means and said third driver means.

2. A motor control apparatus for a 3-phase induction motor comprising in combination:

a first control means connected in series with a first supply line;

a first voltage sensing means connected across said first control means for sensing the back emf across said first control means when said first control means is open;

a first crossover reference means connected to the input of said first control means;

a second control means connected in series with a second supply line;

a second voltage sensing means connected across said second control means for sensing the back emf across said second control means when said second control means is open;

a second crossover reference means connected to the input of said second control means;

a third control means connected in series with a third supply line;

a third voltage sensing means connected across said third control means for sensing the back emf across said third control means when said third control means is open;

a third crossover reference means connected to the input of said third control means;

a summing amplifier for summing the output of said first voltage sensing means, said second voltage sensing means and said third voltage sensing means;

a power supply means for developing a reference voltage signal representative of line voltage;

a first comparator means for comparing the output of said summing amplifier with said reference voltage signal for developing a voltage control signal wherein said reference voltage signal is conducted to said first comparator means through a pair of reverse-connected diodes;

current sensing means associated with a supply line for sensing current drawn by the motor;

rectifier means connected to said current sensing means for developing a current signal representative of current drawn by the motor;

limiting means for limiting the magnitude of said current signal and for producing a current control signal;

a first voltage divider connected across positive and negative voltage sources for producing a minimum voltage reference signal;

a second comparator means for comparing said voltage control signal with said current control signal and with said minimum voltage reference signal for developing a phase control signal;

a first phase control means for comparing said phase control signal with the output of said first crossover reference means;

a second phase control means for comparing said phase control signal with the output of said second crossover reference means;

a third phase control means for comparing said phase control signal with the output of said third crossover reference means;

a first driver means for accepting the output of said first phase control means and for controlling said first control means;

a second driver means for accepting the output of said second phase control means and for controlling said second control means;

a third driver means for accepting the output of said third phase control means and for controlling said third control means;

starting control means for providing a soft start for the motor;

a first capacitor connected between the output of said pair of reverse-connected diodes and ground for filtering said reference voltage signal;

a third voltae divider comprising a third resistor and a fourth resistor connected in series to the output of said pair of reverse-connected diodes; and a second capacitor connected between the output of said third voltage divider and ground.

3. A motor control apparatus as set forth in claim 2, wherein said starting control means includes adjustable torque control means for controlling the torque of the motor during the starting interval.

4. A motor control apparatus as set forth in claim 3, wherein said starting control means includes an adjustable time control means for setting the length of said starting interval.

5. A motor control apparatus as set forth in claim 4, wherein said starting control means further comprises a third capacitor connected to said torque control means, the charging of which occurs during said starting interval for creating a starting ramp signal.

6. A motor control apparatus as set forth in claim 5, wherein said starting control means further comprises a fourth comparator means for comparing the state of charge of said third capacitor to a fixed voltage reference for producing a run signal.

7. A motor control apparatus as set forth in claim 6, wherein said starting control means further comprises in combination:

an SCR controlled by said run signal;

a transistor, wherein said transistor disables said current signal during said starting interval and said SCR switches said transistor off at the end of said starting interval.

8. A motor control apparatus as set forth in claim 7, wherein said starting control means further comprises a delay network which comprises a fifth resistor and a fourth capacitor connected to the input of said fourth comparators means for conducting said starting ramp signal to said fourth comparator means.

9. A motor control apparatus as set forth in claim 8, wherein said starting control means further comprises a diode and a sixth resistor in series connected to the input of said fourth comparator for providing a discharge path for said fourth capacitor.

* * * * *